(12) United States Patent
Ojala

(10) Patent No.: US 12,409,621 B2
(45) Date of Patent: Sep. 9, 2025

(54) TYRE AND A METHOD FOR MANUFACTURING A TYRE

(71) Applicant: NOKIAN RENKAAT OYJ, Nokia (FI)

(72) Inventor: Jari Ojala, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 0 days.

(21) Appl. No.: 18/479,713

(22) Filed: Oct. 2, 2023

(65) Prior Publication Data

US 2024/0109376 A1 Apr. 4, 2024

(30) Foreign Application Priority Data

Oct. 3, 2022 (FI) .................................... 20225885

(51) Int. Cl.
*B29D 30/00* (2006.01)
*B60C 19/00* (2006.01)

(52) U.S. Cl.
CPC ........ *B29D 30/0061* (2013.01); *B60C 19/002* (2013.01); *B29D 2030/0077* (2013.01); *B29D 2030/0083* (2013.01); *B60C 2019/004* (2013.01)

(58) Field of Classification Search
CPC . B60C 19/002; B60C 19/12; B60C 2019/004; B60C 11/24; B60C 11/243; B60C 11/246; B29D 30/0061; B29D 30/0685; B29D 2030/0077; B29D 2030/0083; B29D 2030/0686; B29D 2030/0694; B29D 2030/0695
USPC .............................................. 156/110.1, 115
See application file for complete search history.

(56) References Cited

U.S. PATENT DOCUMENTS

| | | | |
|---|---|---|---|
| 2014/0166168 A1 | 6/2014 | Engel | |
| 2015/0290975 A1* | 10/2015 | Custodero | B29D 30/0681 156/123 |
| 2019/0359010 A1* | 11/2019 | Setokawa | B60C 11/243 |
| 2020/0079159 A1 | 3/2020 | Destraves | |
| 2021/0129601 A1* | 5/2021 | Ferry | G01L 17/00 |
| 2021/0245552 A1* | 8/2021 | Kukkonen | B60C 11/1637 |
| 2021/0300126 A1* | 9/2021 | Naruse | B60C 11/243 |
| 2021/0300127 A1 | 9/2021 | Hoshiba | |

(Continued)

FOREIGN PATENT DOCUMENTS

| | | | |
|---|---|---|---|
| DE | 102015217472 A1 | 3/2017 | |
| DE | 102018206819 A1 | 11/2019 | |

(Continued)

OTHER PUBLICATIONS

Zebian et al., DE 102018220987, update machine translation. (Year: 2020).*

(Continued)

*Primary Examiner* — Sedef E Paquette
(74) *Attorney, Agent, or Firm* — Merchant & Gould P.C.

(57) ABSTRACT

A tyre includes a body, a tread and an inner surface. Part of the inner surface has a noise-absorbing agent for absorbing tyre noise. The inner surface includes at least one spot free from noise-absorbing agent, provided with a module for wireless data transmission. The tyre includes a sensor arranged in the tread. The module is configured for reading data from the sensor. The module and the sensor are aligned to each other in the tyre. A method is for manufacturing such a tyre.

11 Claims, 5 Drawing Sheets

(56) References Cited

U.S. PATENT DOCUMENTS

2022/0332149 A1* 10/2022 Setokawa ............. B60C 11/243
2023/0182512 A1* 6/2023 Nicula ................. B60C 19/002
                                                             152/450

FOREIGN PATENT DOCUMENTS

| DE | 102018220978 A1 | 6/2020 | | |
|---|---|---|---|---|
| DE | 102018220987 A1 | 6/2020 | | |
| EP | 3543042 A1 | 9/2019 | | |
| FR | 3059605 A1 | 6/2018 | | |
| WO | 2019221879 A1 | 11/2019 | | |
| WO | WO-2020022163 A1 * | 1/2020 | ......... | B29D 30/0061 |
| WO | 2020095158 A1 | 5/2020 | | |

OTHER PUBLICATIONS

Hoshiba T, WO-2020022163-A1, machine translation. (Year: 2020).*
Finnish Office Action received for FI Application No. 20225885 on Apr. 20, 2023, 10 pgs.

* cited by examiner

US 12,409,621 B2

TYRE AND A METHOD FOR MANUFACTURING A TYRE

CROSS-REFERENCE TO THE RELATED APPLICATIONS

The present application claims priority to Finnish Patent Application No. 20225885 filed on Oct. 3, 2022, which application is incorporated herein by reference in its entirety.

FIELD OF THE INVENTION

The invention relates to a tyre for a vehicle. The invention relates to a vehicle tyre equipped with a sensor. The invention relates to a vehicle tyre having a low noise level. The invention relates to a method for manufacturing such a tyre.

BACKGROUND OF THE INVENTION

It is known to provide a vehicle tyre with a sensor for measuring the properties of the tyre and/or the environment of the tyre, from the outside or the outer surface of the tyre. Such a sensor may communicate with a reader device. It is also known to provide noise-absorbing agent on the inside of the tyre, for reducing tyre noise.

In a prior art solution, the reader device for the sensor can be arranged in the rigid part of the vehicle. Thus, noise-absorbing agent to be provided on the inside of the tyre does not hinder the attachment of the reader device. However, for data transmission, it is necessary to provide a reliable data transmission connection between the sensor and the reader device. A solution is also known in which the reader device is arranged in the tyre, within its carcass. It has been found that noise-absorbing agent hinders the fastening of the reader device.

BRIEF SUMMARY OF THE INVENTION

It is an aim of the present invention to provide a solution for simultaneously securing reliable data transmission between the sensor and the reader device and the reliable attachment of the reader device in the tyre.

DETAILED DESCRIPTION OF THE INVENTION

It is an aim of the present invention to provide a solution for simultaneously securing reliable data transmission between a sensor in the tyre and a reader device, and reliable attachment of the reader device to a tyre comprising noise-absorbing agent. Further below, the reader device will be referred to by the term module. Noise-absorbing agent refers to a substance which is capable of damping noise and is or will be provided in the tyre for this purpose. Such a noise-absorbing agent is preferably ultralight substance as will be described hereinbelow.

Figure 1A:
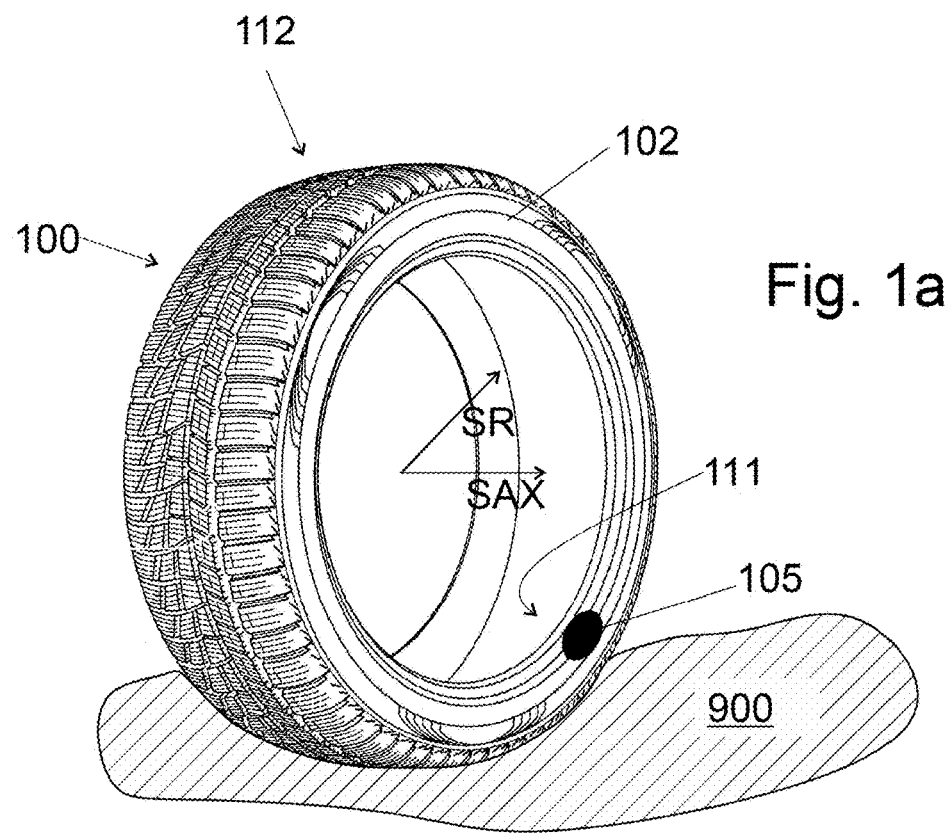
FIG. 1a shows a tyre.

FIG. 1a shows a tyre 100. The tyre 100 is suitable for use in a vehicle. The tyre 100 is preferably a pneumatic tyre, more preferably a tubeless pneumatic tyre. The tyre 100 may be, for example, a tubeless pneumatic tyre for a car, suitable for on-road conditions.

The tyre 100 comprises a body (or carcass) 102 and a tread 112 which is suitable for rolling contact with a surface 900. Furthermore, the tyre comprises an inner surface 111. Part of the inner surface 111 is a surface opposite the tread 112.

Figure 1B:
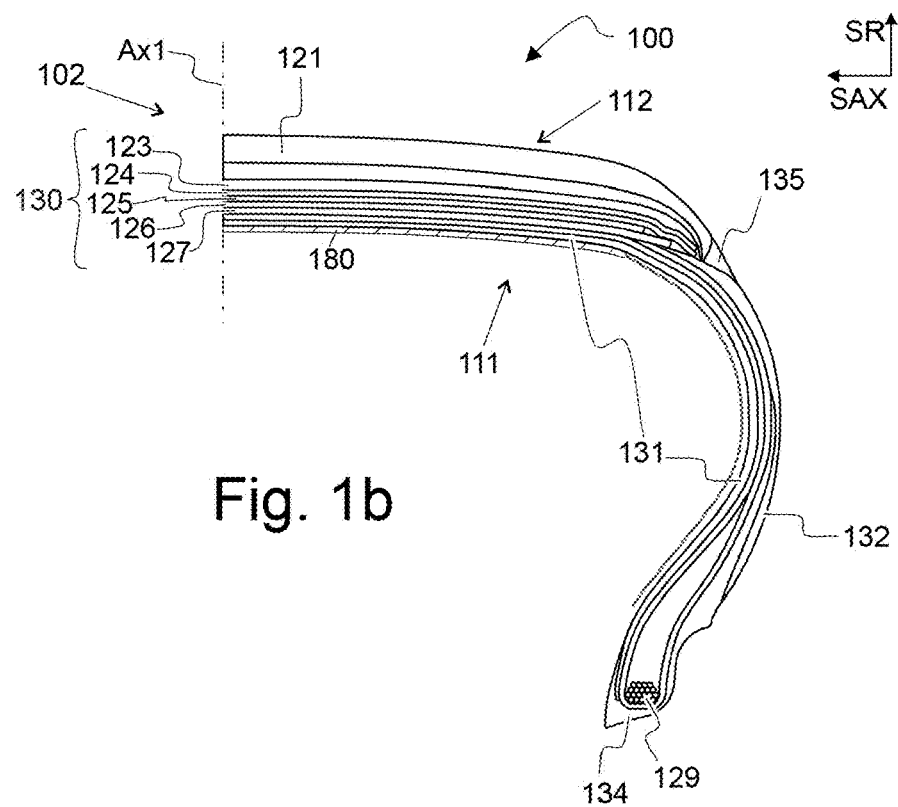
FIG. 1b shows a quarter of a cross-section of a tyre.

FIG. 1b shows the structure of a typical tyre. FIG. 1b shows a quarter of the cross-section of a tyre. The structure of the tyre may be substantially mirror symmetrical with respect to the central axis Ax1 shown in FIG. 1b; however, for example the tread pattern does not need to be mirror symmetrical. Preferably, the embodiments relate to a tyre 100 having such a structure. FIGS. 1a and 1b show the radial direction SR and the axial direction SAX of the tyre. The axial direction SAX is parallel to the rotation axis of the tyre. The radial direction SR is parallel to the radius of the tyre and extends away from the rotation axis.

The tread 112 is typically formed by a tread block arrangement 121 (see FIG. 1b) comprising tread blocks 122 (see FIG. 2a) which delimit grooves in the tread 112 of the tyre 100. Shoulder areas 135 of the tyre 100 are left at the edges of the tread bar arrangement 121. As needed, the tread 112 may be provided with studs and/or sipes and/or mechanical indicators, such as running-in indicators.

The tyre 100 has side surfaces 132. The side surfaces 132 connect a bead area 134 to the tread 112. The side surface 132 may be provided with various markings which indicate the size of the tyre, the speed category of the tyre, the intended use of the tyre (winter/summer), the manufacturer of the tyre, and/or the brand of the tyre. A cable 129 is provided in the bead area. The function of the cable 129 and the bead area 134 is to fit the tyre 100 on a rim. For stabilizing the tyre 100, it comprises a first ply cord 127 and a first metal belt 125. In an embodiment, the tyre also comprises a textile belt 123. In a preferred embodiment, the tyre 100 comprises a first ply cord 127, a second ply cord 126, a first metal belt 125, a second metal belt 124, and a textile belt 123.

The first metal belt 124 or metal belts 124, 125 are preferably steel belts. The first ply cord 127 or ply cords 126, 127 preferably comprise a fibrous substance, such as fabric, glass fibre, aramid fibre, or carbon fibre. The textile belt 123 comprises a fibrous substance in textile form. Preferably, the textile belt 123 comprises fibrous polymer. Particularly preferably, the textile belt 123 comprises fibrous polyamide in textile form, for example aromatic polyamide in textile form. Materials comprising fibrous polyamides include, for example, nylon, aramid, and Cordura®.

At least the first ply cord 127 and the first metal belt 125 together constitute a reinforcement 130 for the tyre. Preferably, the reinforcement 130 also comprises a textile belt 123. More preferably, the reinforcement 130 further comprises a textile belt 123, a second ply cord 126 and a second metal belt 124.

Furthermore, the tyre typically comprises an inner liner 131. The English term 'inner liner' is commonly known in the field. A Finnish translation less frequently used for this term corresponds to 'inner rubber liner', but the established term 'inner liner' will be used in this specification. The function of the inner liner 131 (i.e. inner rubber liner 131) is to prevent or decelerate the diffusion of air or other gas through the tyre 100, in other words, to improve the air (or other gas) tightness of the tyre 100. The inner liner 131 is thus arranged to improve the tightness of the tyre 100. Most typically, the inner liner 131 comprises or is made of butyl rubber. Most preferably, the inner liner 131 comprises or is made of halobutyl rubber, such as bromobutyl rubber and/or chlorobutyl rubber, because such a material has good air tightness.

Furthermore, noise-absorbing agent 180 is provided on the inside of the tyre 100. The function of the noise-absorbing agent 180 is to reduce tyre noise. Thus, part of the inner surface 111 of the tyre 100 is consists of noise-absorbing agent 180 suitable for reducing tyre noise. In this description, the term 'inside' refers to that side of the tyre which is closer to the rotation axis of the tyre 100, in the radial direction SR, than the tread 112.

Figure 2A:
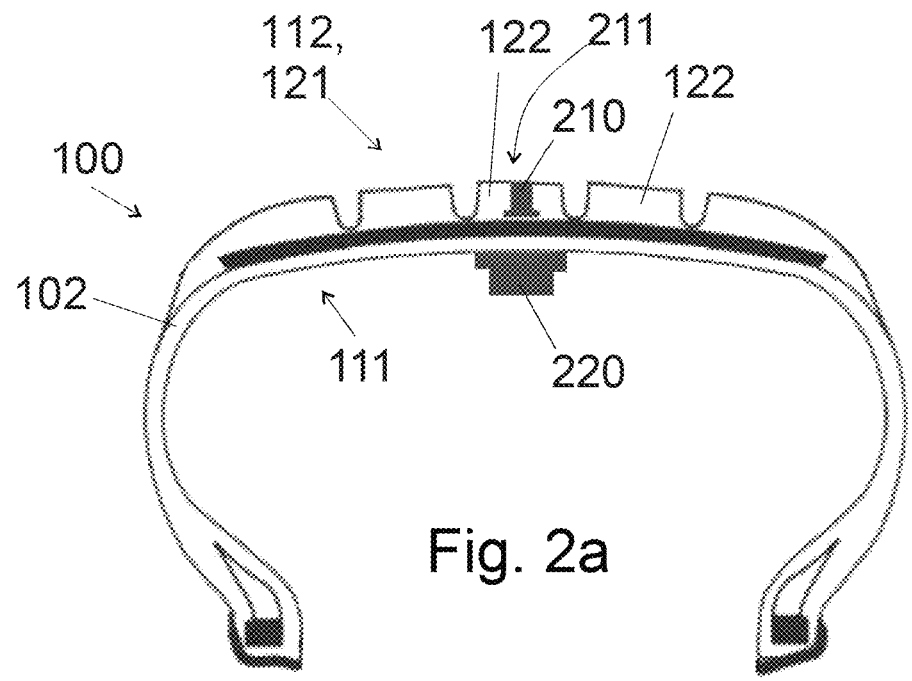
FIG. 2a shows a half of a cross-section of a tyre.

Referring to FIG. 2a, the tyre 100 comprises a sensor 210 arranged in the tread 112. More precisely, the sensor 210 is arranged in a tread block 122 in the tread block arrangement 121 of the tyre 100. The sensor 210 is arranged in the tread 112 for measuring the tread 112 of the tyre and/or the environment outside the tyre. In an embodiment, part of the sensor 210 constitutes a part of the tread 112 of the tyre. Thus, the sensor 210 is also in contact with the environment, for example, via a blind hole 212 (see FIGS. 5a and 5b), and not totally embedded in the tyre material. The sensor 210 is preferably arranged to indicate at least the wear of the tread 112 of the tyre. In addition to the wear of the tread 112 of the tyre, the sensor 210 may indicate ambient moisture and/or temperature and/or tyre friction and/or acceleration of the sensor 210. Furthermore, in addition to the wear of the tread 112 of the tyre, the sensor 210 may also indicate forces exerted on the tyre, whereby it may comprise, for example, an element for measuring strain and/or tension. Alternatively, it is possible that the sensor 210 is not arranged to indicate wear of the tread 112 of the tyre but is arranged to indicate another variable mentioned above in connection with the wear of the tread 112 of the tyre.

The tyre 100 also comprises a module 220. The module 220 is used, among other things, as a reader device for the sensor 210. For this reason, the module 220 comprises means for reading information from the sensor 210. Correspondingly, the sensor 210 comprises means for transmitting information.

In an embodiment, the module 220 comprises means for inductively reading information from the sensor 210. Correspondingly, the sensor 210 thus comprises means for inductively transmitting information. In an embodiment, the module 220 comprises a first inductive component, such as a coil, and the sensor 210 comprises a second inductive component, such as a coil, so that the first and second inductive components are arranged to be inductively connected to each other.

Furthermore, the module 220 may comprise a sensor arrangement. The sensor arrangement of the module 220 may be arranged to measure at least one of the following: pressure, acceleration, and temperature.

For improving the data transmission between the sensor 210 and the module 220, the sensor 210 and the module 220 are aligned to each other. This alignment will be discussed further below. In an embodiment, the sensor 210 and the module 220 are aligned. However, the information obtained from the sensor 210 needs to be transmitted to a user and/or a server as well. Therefore, the module 220 also comprises means for wireless transmission of information. In an embodiment, the module 220 comprises an antenna for wireless transmission of information. In an embodiment, the module 220 comprises a power source for driving the module. Said power source may be an accumulator, a battery, a capacitor, or a converter (i.e. harvester) for converting (i.e. harvesting) other forms of energy, such as mechanical energy, to electric current; or a combination of these. Such a converter is also called an interceptor or a harvester, and the operation of the converter may be called scavenging of electric energy or harvesting of electric energy. In addition to the converter, i.e. harvester, it is possible to use a unit for storing electric energy, such as a battery or a capacitor. In an embodiment, the sensor 210 is arranged to generate the electric energy needed for its operation by means of said second inductive component included in the sensor 210.

The term 'tyre body 102' has been presented above. The body 102 of the tyre refers to such a part of the tyre to which the tread 112 and the noise-absorbing agent 180 are or have been attached. In other words, the tyre body 102 does not comprise the noise-absorbing agent 180, the sensor 210, nor the module 220. The body 102 does not need to comprise the tread block arrangement 121 of the tyre 100.

Figure 2B:
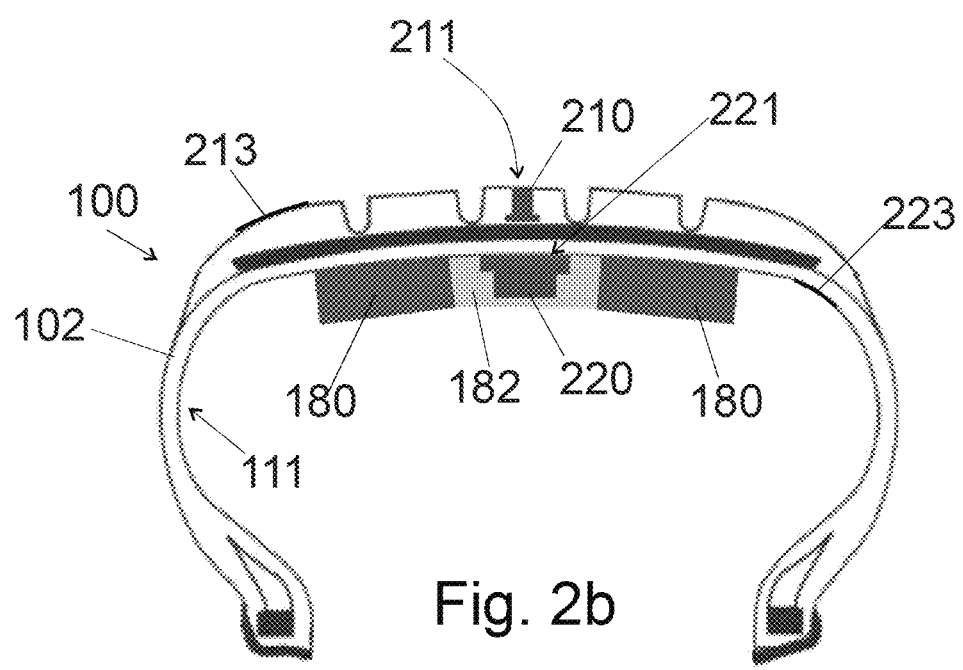
FIG. 2b shows a half of a cross-section of a tyre according to an embodiment.

With reference to FIG. 2b, part of the inner surface 111 of the tyre 100 is formed by the noise-absorbing agent 180. For fastening the module 200 to the tyre, the module 220 is arranged in a spot 182 free from noise-absorbing agent 180 in the tyre, either on or in the inner surface 111 of the tyre 100. Thus, the inner surface 111 comprises at least one spot 182 which is free from noise-absorbing agent 180 and in which the module 220 is arranged. However, it is noted that there is not necessarily any space left free from noise-absorbing agent between the module 220 and the noise-absorbing agent 180. In any case, there is no noise-absorbing agent at the very spot of the module 220. Moreover, there is no noise-absorbing agent 180 left between the module 220 and the tyre body 102 on the inside of the tyre 100, seen in the radial direction SR from the body 102. Particularly preferably, the noise-absorbing agent 180 surrounds the module 220 in all directions of the inner surface 111 defined by the location 221 of the module (see FIGS. 3a and 3b). In other words, particularly preferably, the noise-absorbing agent 180 surrounds the module 220 in all directions perpendicular to the direction of the thickness of the tyre body 102 at the location of the module 220. If the module 220 is aligned with the sensor 210 in the tread 112, the noise-absorbing agent 180 preferably surrounds the module 220 in all directions perpendicular to the radial direction SR of the tyre.

As will be described further in connection with the method below, such a spot 182 free from noise-absorbing agent can be arranged, for example, by removing noise-absorbing agent 180 from this spot or by providing noise-absorbing agent 180 at only other locations on the inner surface but not on the spot 182 to be free from noise-absorbing agent. As will be described further below, it is not necessary to provide noise-absorbing agent 180 on the whole inside of the tyre 100 either.

The tyre 100 is vulcanized, i.e. hardened, during its manufacture.

Such a tyre 100 is made, for example, by vulcanizing a tyre (i.e. an unvulcanized tyre), whereby the tyre 100

(vulcanized tyre as well as unvulcanized tyre) comprises said tread 112 suitable for rolling contact with a surface 900. The tyre 100 (vulcanized tyre as well as unvulcanized tyre) further comprises an inner surface 111 as described above.

Figure 5A:
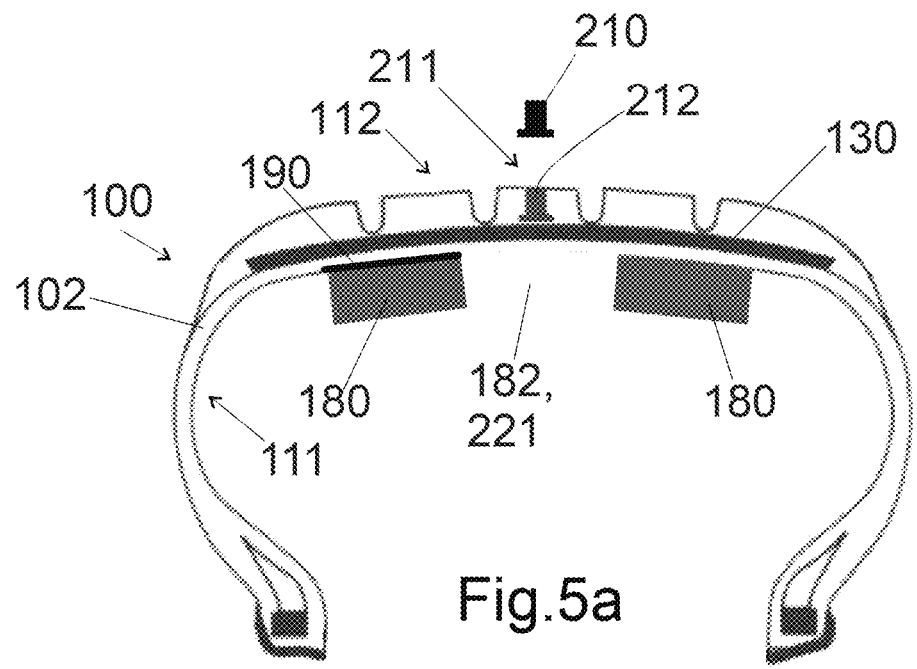
FIG. 5a shows a half of a cross-section of a tyre in a first step of manufacture of the tyre.

Referring to FIG. 5a, a blind hole 212 for a sensor 210 is provided at a location 211 for the sensor in the tread 112 before, during or after the vulcanization in the method. Before vulcanization, the blind hole 212 can be formed by pressing with a suitable pin. During vulcanization, the blind hole 212 can be formed by a pin arranged in the tyre mould. When said pin is removed from the (vulcanized) tyre 100, the blind hole 212 for the sensor is left in the tyre. After vulcanization, the blind hole 212 can be formed, for example, by machining, such as drilling, milling or cutting (e.g. by means of a laser), or burning (e.g. by means of a laser). Thus, it is not necessary to make a blind hole for the sensor during vulcanization.

In the method, noise-absorbing agent 180 suitable for reducing tyre noise is provided on the inside of the tyre (vulcanized or unvulcanized) so that the inner surface 111 of the tyre is free from noise-absorbing agent at the location 221 for the module on the inside of the tyre. Preferably, the method comprises providing noise-absorbing agent 180 on the inside of the vulcanized tyre as described above; that is, the noise-absorbing agent 180 is arranged in the tyre 100 first after vulcanization.

Figure 4A:
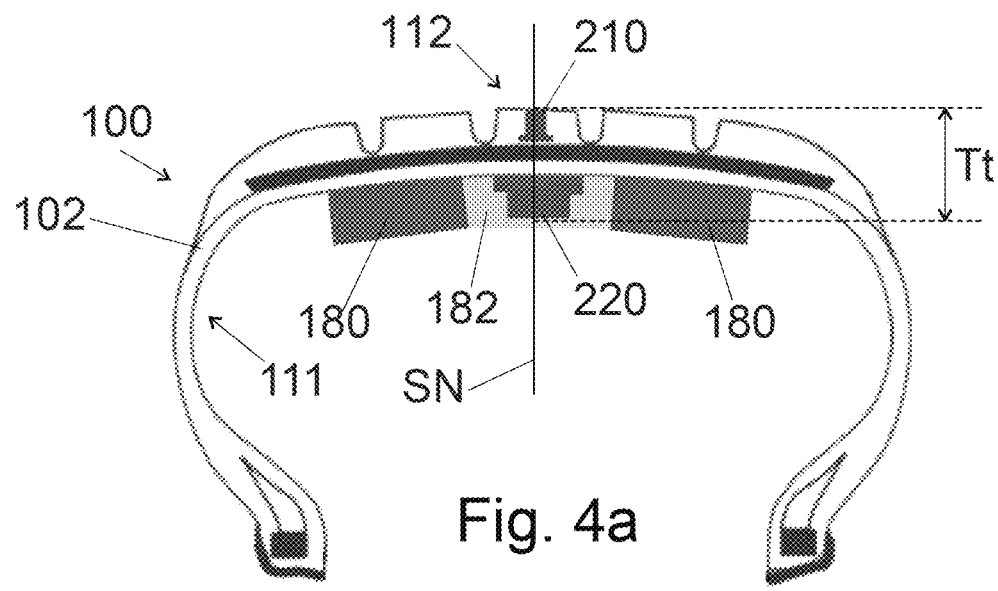
FIG. 4a shows a half of a cross-section of a tyre according to an embodiment.
Figure 4B:
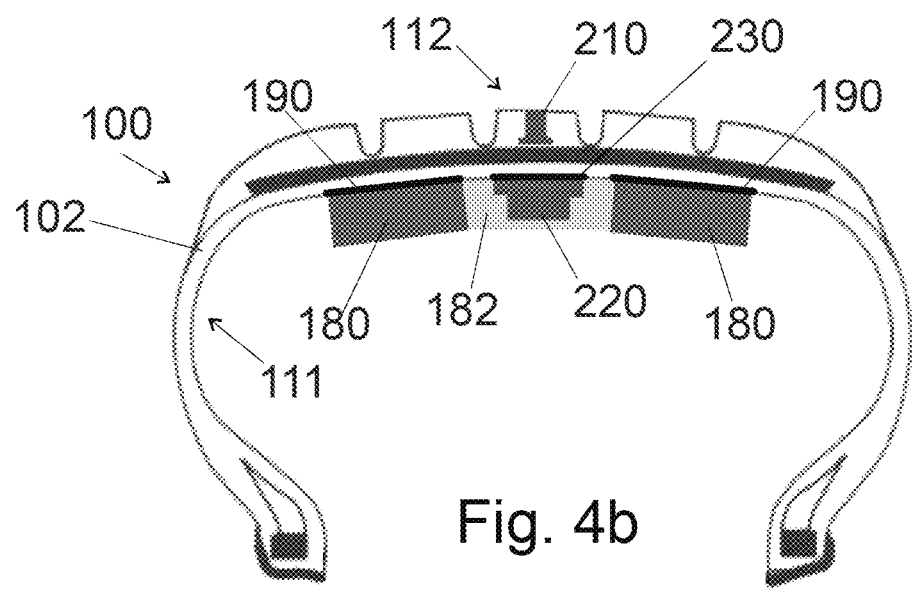
FIG. 4b shows a half of a cross-section of a tyre according to an embodiment.
Figure 5B:
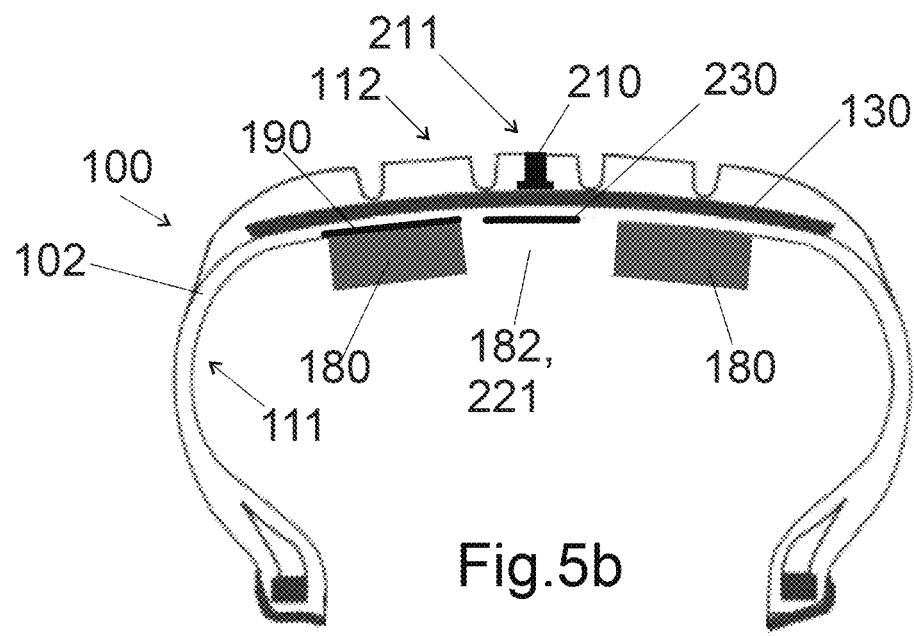
FIG. 5b shows a half of the cross-section of a tyre in a second step of manufacture of the tyre.

FIGS. 5a and 5b show an adhesive band or tape 190 for attaching noise-absorbing agent 180 (cf. also FIG. 4b). However, such a tape 190 is not necessarily needed.

The method comprises aligning the location 211 for the sensor and the location for the module 221. In an embodiment, the location 211 for the sensor is aligned with the location 221 for the module, or the location 221 for the module is aligned with the location 211 for the sensor. As will be described below, the alignment of both locations 221, 211 can be performed with respect to a reference point, which reference point is neither of said locations 211, 221. The reference point may be, for example, a marking. Thus, after the installation of the module 220 and the sensor 210, the module 220 and the sensor 210 are aligned to each other in the tyre 100. Preferably, the location 211 for the sensor and the location 221 for the module are aligned to each other so that the location 211 for the sensor and the location 221 for the module are aligned.

Furthermore, the method comprises installing the sensor 210 in the blind hole 212. FIG. 5b illustrates a situation after the installation of the sensor 210 in the blind hole 212 (cf. also FIG. 5a). In FIG. 5b, the module 220 is not yet attached. The method comprises attaching the module 220 to the location 221 for the module. When the module is attached to the location 221 for the module shown in FIG. 5b, a tyre 100 substantially as shown in FIG. 4b is obtained. With respect to the adhesive bands or tapes, FIGS. 5b and 4b do not correspond to each other, but it is obvious that the tyre could be provided with similar adhesive bands or tapes 190 as in FIG. 4b already before attaching the module 220 (cf. FIG. 5b).

The module 220 can be attached to the location 221 for the module by, for example, adhesive or tape, as will be described below. The sensor 210 can be installed in the blind hole 212 in the same way as a stud is installed in a winter tyre, for improving road holding on ice. What has been said above on the data transmission between the module 220 and the sensor 210, and the respective means in connection with the tyre 100, applies to the method as well. What has been said above on the energy used by the module 220 and the sensor 210 in connection with the tyre 100, applies to the method as well. What has been said above on the means of the module 220 for transmitting data and/or for reading data from the sensor 210 in connection with the tyre 100, applies to the method as well.

In a preferred embodiment, noise-absorbing agent 180 is first, but after vulcanization, provided on the inner surface 111 of the tyre, including the location 221 for the module. In this embodiment, part of the noise-absorbing agent is removed from the inner surface 111 of the tyre, whereby the location 221 for the module is formed so that the inner surface 111 is free from noise-absorbing agent at the location 221 for the module.

With reference to FIG. 4a, regarding the tyre, the sensor 210 and the module 220 are preferably aligned to each other so that a straight line SN parallel to the normal of the tread 112 of the tyre at the location of the sensor 210 passes through the module 220 and the sensor 210. Alternatively or in addition, a straight line parallel to the normal of the inner surface 111 at the location of the module 220 passes through the module 220 and the sensor 210. Furthermore, the module 220 and the sensor 210 are on the same side of the axis of rotation of the tyre. In other words, the distance between the module 220 and the sensor 210 is not greater than the thickness Tt of the tyre. In this context, the thickness Tt of the tyre refers to the thickness measured at said straight line, and the thickness Tt is left between the tread 112 and the inner surface 111. In practice, the distance between the module 220 and the sensor 210 is slightly smaller than the thickness Tt, because the sensor 210 is installed in the blind hole in the tread 112 of the tyre. In such an embodiment, the distance between the sensor 210 and the module 220 is short, and data transmission is thus reliable.

Correspondingly, in the method, the location 211 for the sensor and the location 221 for the module are preferably aligned to each other so that the straight line SN which is parallel to a normal of the tread 112 of the tyre at the location 211 for the sensor, passes through the location 221 for the module and the location 211 for the sensor. Alternatively or in addition, said alignment is such that a straight line parallel to the normal of the inner surface 111 of the tyre at the location 221 for the module passes through the location 221 for the module and the location 211 for the sensor.

Furthermore, the location 221 for the module and the location 211 for the sensor are on the same side of the axis of rotation of the tyre. In other words, the distance between the location 221 for the module and the location 211 for the sensor is equal to or smaller than the thickness Tt of the tyre.

In an embodiment of the method, noise-absorbing agent 180 is provided in locations other than the location 221 for the module on the inside of the tyre. The noise-absorbing agent 180 may be, for example, a sheet-like piece provided with a hole. Said hole can be provided at the location 221 for the module on the inner surface 111 of the tyre. For example, noise-absorbing agent 180 in hardenable fluid form can be extruded onto the inner surface 111 of the tyre, in locations other than the location 221 for the module. However, in such a case it has turned out to be difficult to align the location 221 for the module (i.e. the spot 182 to be free from noise-absorbing agent) with the location for the sensor.

Therefore, in an embodiment of the method, noise-absorbing agent 180 is also provided at the location 221 for the module on the inside of the tyre, and after that, the noise-absorbing agent 180 is removed from the location 221 for the module. The noise-absorbing agent 180 may be, for example, a sheet-like solid piece provided on the inside of the tyre 100. For example, noise-absorbing agent 180 in hardenable fluid form can be extruded onto the inner surface 111 of the tyre and removed from the location 221 for the module.

In an embodiment of the method, a blind hole 212 is arranged at the location 211 for the sensor in the tread 112 before providing noise-absorbing agent 180 on the inside of the tyre 100. This facilitates the making of the blind hole 212. For example, the blind hole 212 can be made during vulcanization, and the noise-absorbing agent 180 can be provided not until in the vulcanized tyre. Alternatively, the blind hole 212 can be made in the tyre after vulcanization but before the installation of the noise-absorbing agent 180.

Preferably in this embodiment, the sensor 210 is also installed in the blind hole 212 before providing the noise-absorbing agent 180 on the inside of the tyre 100. This facilitates the processing of the tyre as well. It is possible to provide a vulcanized tyre with the blind hole 212 not until after the installation of the noise-absorbing agent 180, but in such a case it is typically more difficult to process the tyre when making the blind hole 212.

Furthermore, it is possible to provide the tyre, after its vulcanization, with the noise-absorbing agent 180 first and only then to arrange the blind hole 212 at the location for the sensor 211 in the tread 112. In such a solution, to preserve the properties of the noise-absorbing agent, it may be preferable to inflate the tyre for the time of providing the tread 112 with the blind hole 212 and possibly also for the time of installing the sensor 210 in the blind hole. For these reasons, the tread 112 is preferably provided with the blind hole 212 at the location 211 for the sensor before providing the noise-absorbing agent 180 on the inside of the tyre 100.

Preferably, the blind hole 212 is machined at the location 211 for the sensor in the tread 112 after vulcanization, or the blind hole 212 is arranged in the tread 112 during vulcanization; and the noise-absorbing agent is installed after this. More preferably, the blind hole 212 is machined at the location 211 for the sensor in the tread 112 after vulcanization, and the noise-absorbing agent is installed in the tyre after this. This makes it possible to install a sensor 210 in only some of the tyres manufactured on a production line. Thus, two types of tyres can be made on a single production line, which increases the product range with low production costs.

As is well known, machining in general can be implemented by a high-energy method or a low-energy method. Correspondingly, the machining of said blind hole can be implemented by a low-energy machining method or a high-energy machining method. Suitable machining methods include, in particular, drilling, milling, burning, and cutting, of which one or more methods can be applied in the machining of the blind hole 212. Drilling and milling are low-energy methods. Burning and cutting can be implemented by using, for example, a laser, whereby the machining is carried out by a high-energy method. Preferably, the bottom hole 212 is machined by drilling.

The alignment of the location 211 for the sensor and the location 221 for the module can be facilitated by means of a marking or markings. For example, the tyre 100 can be provided with a first marking 223 to indicate the location 221 for the module (see FIG. 2b), before installing the module 220. Alternatively or in addition, the tyre 100 can be provided with a second marking 213 to indicate the location 211 for the sensor (see FIG. 2b), before making the blind hole 212.

For these reasons, in an embodiment of the method, the inner surface 111 of the tyre 100 is provided with a first marking 223 to indicate the location 221 for the module, and/or the outer surface, for example the tread 112, of the tyre is provided with a second marking 213 to indicate the location 211 for the sensor. For the first marking 223 in particular, it is noted that the first marking 223 is preferably made at such a location where the first marking 223 is visible also after the provision of the noise-absorbing agent 180. In other words, the method comprises providing the noise-absorbing agent 180 on the inside of the tyre 100 without covering the first marking 223 which shows the location 221 for the module 220. This makes it possible to use the first marking 223 for removing some of the noise-absorbing agent 180 later on, to form a spot 182 free from noise-absorbing agent at the location 221 for the module. The markings 211, 223 do not need to be removed. Therefore, the finished tyre 110 may also comprise at least one of the following: the first marking 223, showing the location 221 for the module, and the second marking 213, showing the location 211 for the sensor.

As presented above, preferably the blind hole 212 is made before providing the noise-absorbing agent 180. Naturally, the blind hole 212 as such indicates the location 211 for the sensor. Therefore, preferably after the drilling or providing of the blind hole 212, noise-absorbing agent 180 is provided on the inside of the tyre, and the first marking 223 is applied on the inner surface 111 of the tyre, to indicate the location 221 for the module. More preferably, said first marking 223 is applied before providing the noise-absorbing agent 180 and after making the blind hole 212. Most preferably, the sensor 210 is installed in the blind hole 212, too, before noise-absorbing agent is provided on the inside of the tyre 100. The first marking 223 is applied on the inner surface 111 of the tyre preferably with a dye, such as paint or ink. In this context, dye also refers to ultraviolet dyes, i.e. substances which are particularly well visible under UV light. Preferably, the colour of the dye is not the same as the colour of the inner surface 111 of the tyre. Preferably, the colour of the first marking 223 is different from black.

A first marking 223 indicating such a method may be left on the tyre 100. Therefore, one embodiment of the tyre 100 comprises a first marking 223 on the inner surface 111, indicating the location 221 for the module. The first marking 223 may comprise a dye as described above.

In an embodiment, the tyre has a secondary marking 105 (see FIG. 1a) which primarily serves a different purpose, such as indicating the tyre size (e.g. "215/55R16") or indicating the brand name of the tyre (e.g. "Hakkapeliitta") or indicating the use environment of the tyre (for example, "M/S"), and such a secondary marking 105 is utilized in determining the location 221 for the module 220 and, optionally, also in determining the location 211 for the sensor 210. Such a secondary marking 105 may be applied in the tyre, for example, during vulcanization in a mould. The secondary marking 105 can be detected from the tyre and used for aligning the location 211 for the sensor with the location 221 for the module. For example, the location 211 for the sensor and the location 221 for the module may have specific coordinates with respect to such a secondary marking 105. Said coordinates are preferably such that the location 221 for the sensor and the location 221 for the module are aligned as described above. For example, the sensor 210 can be installed in a tread block and, after installing, the location 211 (i.e. coordinates) of the sensor can be detected in relation to the secondary marking 105. After this, the location for the module can be determined by means of said coordinates and said secondary marking 105.

In an embodiment, the secondary marking 105 is detected automatically, for example by machine vision. Although the secondary marking 105 is shown on the side surface of the tyre in FIG. 1a, such a secondary marking 105 may be arranged on the tread. Thus, the same marking may be said secondary marking 105 and said second marking 213. For example, the tread may be provided with a marking indicating a risk of aquaplaning or wear. When the location 211 for the sensor 210 is known, it is possible to align the location 211 for the sensor and the location 221 for the module.

In an embodiment, after installing the sensor 210 in the blind hole, the location 211 of the sensor 210 is detected. The location 211 of the sensor can be detected, for example, inductively. Upon detecting the location 211 of the sensor, the strength of the signal received from the sensor indicates the location of the sensor. The location 211 of the sensor can be detected, for example, from the side of the inner surface 111 of the tyre. After this, the location 221 for the module 220 can be aligned with the location 211 of the sensor 210 detected in this way. In this embodiment, the first or second marking 213, 223 or the secondary marking 105 is not necessarily needed.

In an embodiment, the module 220 is attached to the tyre 100 by means of adhesive or tape. If the module 220 is attached to the tyre 100 by means of adhesive or tape, then, in the finished tyre 100, the module 220 is attached to the body 102 of the tyre 100 by means of adhesive or tape. For clarity, it is noted that during the manufacture, the module is not necessarily part of the tyre but the module is attached to the tyre 100 (for example, to the body of the tyre). When the tyre is finished, the module is part of the tyre, the module being fastened to the body 102 of the tyre.

The module 220 does not need to be attached directly to the tyre 100. For example, EP 3 543 042 presents how the module can be installed in a receptacle. Such a receptacle can be attached to the tyre 100 by means of adhesive or tape, and the module 220 can be installed in the receptacle, whereby the module 220 is fastened to the tyre 100 by means of adhesive or tape and also by means of the receptacle. In this case, too, the module 220 is attached to the tyre 100 by at least adhesive or tape. Correspondingly, in a tyre comprising the module 220, the module 220 is attached to the body 102 of the tyre 100 by at least adhesive or tape.

Particularly advantageously, double-sided tape is used for attaching the module. Thus, removing the noise-absorbing agent 180 becomes easier. Double-sided tape refers to a structure in which adhesive is provided on a first side of a base material and adhesive is provided on a second side of the base material. Moreover, a release film is provided on the adhesive on the second side of the base material. Furthermore, a release film may be provided on the adhesive on the first side of the base material.

When double-sided tape is used, the module 200 is preferably attached to the tyre 100 by said double-sided tape 230 (see e.g. FIGS. 5b and 4b) so that the first side of the double-sided tape 230 is attached to the inner surface 111, at the location 221 for the module, after vulcanization of the tyre. If a release film is provided on the adhesive on the first side of the base material, this release film is removed to expose the adhesive, to make the tape adhere to the inner surface 111 of the tyre at the location for the module.

After attaching the double-sided tape 230 to the tyre 100, noise-absorbing agent 180 is provided on the inside of the tyre, suitable for reducing tyre noise, so that the noise-absorbing agent 180 also covers the double-sided tape 230. To expose the spot 182 to be free from noise-absorbing agent, noise-absorbing agent 180 is removed from the location 221 for the module. Therefore, in an embodiment, noise-absorbing agent 180 is removed from the area defined by the double-sided tape 230. The release film of the double-sided tape facilitates the removal of the noise-absorbing agent 180, because the release film of the tape 230 can be removed simultaneously with removing the noise-absorbing agent 180. In other words, the noise-absorbing agent 180 can attach to the release film, which facilitates the removal of the noise-absorbing agent, compared with a situation in which the noise-absorbing agent 180 were attached to the tyre body.

Preferably, the noise-absorbing agent 180 is removed from the area defined by the double-sided tape 230 so that after providing the noise-absorbing agent 180, an incision is cut in the noise-absorbing agent 180 at the location of the double-sided tape 230, and the noise-absorbing agent 180 is removed from the area defined by the incision.

More preferably, in this embodiment, adhesive covered with a release film is provided on the second side of the double-sided tape 230 (opposite the first side of the double-sided tape 230). Furthermore, the noise-absorbing agent 180 is removed from the area defined by the incision, and the release film is removed from the double-sided tape 230. For example, the noise-absorbing agent 180 may be removed from the area defined by the incision by simultaneously removing the release film from the double-sided tape 230. For example, the noise-absorbing agent 180 may attach to the release film of the double-sided tape 230, whereby, upon removing noise-absorbing agent, the release film is also removed and the adhesive of the tape 230 is exposed. Irrespective of the way of removing the release film, the adhesive on the second side of the double-sided tape can be used for attaching the module.

When double-sided tape has been used for attaching the module 220, the module 220 in the tyre 100 is fastened to the body 102 of the tyre 100 by at least double-sided tape. If the above-mentioned receptacle is used, such a receptacle can be attached to the tyre 100 (that is, it can be attached to the tyre body 102) by double-sided tape 230. If the module 220 is attached to the body 102 of the tyre 100 by at least double-sided tape, base material of the double-sided tape is arranged between the tyre body 102 and the module 220. The structure of the double-sided tape was discussed in more detail above.

In removing the noise-absorbing agent 180, a tool, such as a laser, a saw, a drill, a mill, or a gripper, is used. For example, a laser, a saw, a drill, or a mill can cut an incision in the noise-absorbing agent, to be used for removing noise-absorbing agent. The cutting of the incision can be done by burning or by removing material in another way as described above in connection with the method. For example, a gripper can be used to rip or pull part of the noise-absorbing agent off the location 221 for the module. For example, a mill or a drill can be used to remove some of the noise-absorbing agent from the location 221 for the module. For example, a laser can be used to burn some of the noise-absorbing agent off the location 221 for the module. Noise-absorbing agent 180 can be removed by using an above-described device even if double-sided tape were not used for attaching the module 220.

In an embodiment, the device used for removing noise-absorbing agent 180 is aligned with the correct location for removing noise-absorbing agent 180 and/or for cutting an incision in the noise-absorbing agent 180, for example, so that the location 221 for the module is aligned with the location 211 for the sensor. In an embodiment, the device used for removing noise-absorbing agent 180 is aligned by a marking 223 on the inner surface 111 of the tyre 100 to the correct location for removing noise-absorbing agent 180 and/or for cutting an incision in the noise-absorbing agent 180. Naturally, when such a marking is used, the marking 223 is provided on the inner surface 111 of the tyre as described above. In an embodiment, the device used for removing noise-absorbing agent is aligned by means of a secondary marking 105 in the tyre 100 to the correct position for removing noise-absorbing agent 180 and/or for cutting an incision in the noise-absorbing agent 180. In an embodiment, the location 211 for the sensor 210 is detected, and the device used for removing noise-absorbing agent 180 is aligned, by using the data on the position of the sensor 210 obtained in this way, to the correct location for removing noise-absorbing agent 180 and/or for cutting an incision in the noise-absorbing agent 180. In these embodiments, the alignment can be performed by the user, or it can be automated. An automated arrangement, in particular, may further comprise a camera for detecting the first marking 223 or the secondary marking 105. Thus, in an embodiment, the device used for removing noise-absorbing agent 180 is aligned, by means of the first marking 223 on the inner surface 111 of the tyre 100, using a camera, to the correct location for removing noise-absorbing agent 180 and/or for cutting an incision in the noise-absorbing agent 180. In an embodiment, the device used for removing noise-absorbing agent 180 is aligned by means of the secondary marking 105 in the tyre 100, using a camera, to the correct location for removing noise-absorbing agent 180 and/or for cutting an incision in the noise-absorbing agent 180.

In an embodiment, an incision is cut in the noise-absorbing agent 180 at the location 221 for the module, by means of a device used for removing noise-absorbing agent 180, such as a laser, a saw, a mill, or a drill, and the noise-absorbing agent 180 is removed from the area defined by the incision. This can be done, for example, when the noise-absorbing agent 180 at the location 221 for the module is not attached to the tyre 100 at all. This can be done, for example, by attaching the noise-absorbing agent 180 to the inside of the tyre by means of adhesive or tape elsewhere than at the location 221 for the module.

In an embodiment, the noise-absorbing agent 180 is attached to the inner surface 111 of the tyre by tape or adhesive. In this embodiment, the noise-absorbing agent may be a solid flexible sheet, such as a sheet of polymer foam, which is attached by tape or adhesive.

For the above mentioned reasons, in an embodiment, the noise-absorbing agent 180 is attached to the inner surface 111 of the tyre by tape or adhesive so that the location 221 for the module is a spot free from adhesive or tape between the noise-absorbing agent 180 and the tyre body 102. Particularly between the noise-absorbing agent 180 and the tyre body 102, there is no said adhesive or tape at the location 221 for the module outside the noise-absorbing agent 180 in the radial direction SR. In a tyre 100 manufactured in this way, the noise-absorbing agent 180 is attached to the tyre body 102 by adhesive or tape.

More preferably, the noise-absorbing agent 180 is attached to the inside of the tyre by at least one adhesive band or tape, whereby the location 221 for the module is a spot free from said adhesive band or tape between the noise-absorbing agent 180 and the tyre body 102. In a tyre 100 manufactured in this way, the noise-absorbing agent 180 is attached to the tyre body 102 by adhesive band or tape 190. Furthermore, in the method, the location 221 for the module is a spot free from said adhesive band or tape between the noise-absorbing agent 180 and the tyre body 102, whereby the adhesive band or tape 190 in the corresponding tyre 100 does not extend all the way to the module 220. With respect to the adhesive band or tape 190, reference is made to FIG. 4*b*. As shown in the figure, in an embodiment, the adhesive band or tape 190 does not extend in the area 182 free for noise-absorbing agent. Thus, said band 190 does not extend to the module 220 either; that is, the adhesive band or tape 190 does not extend to the module 220. The tape or adhesive band used (if used) in the attachment of the noise-absorbing agent 180 may be double-sided tape as described in connection with the module 220.

Figure 3A:
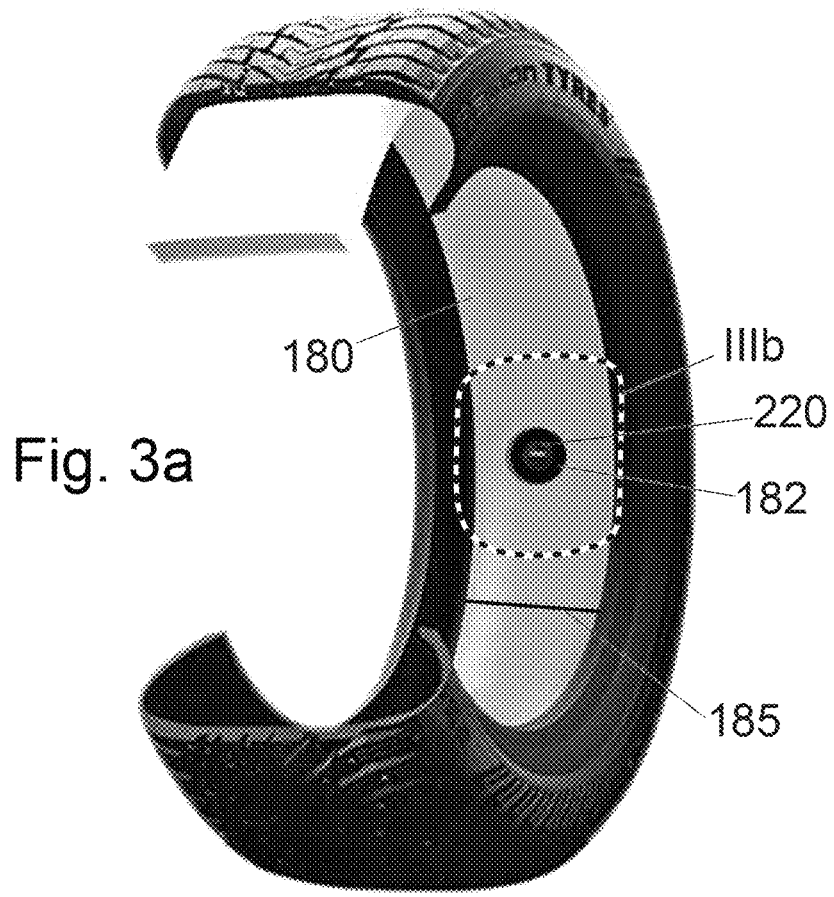
FIG. 3a shows a part of a tyre according to an embodiment.
Figure 3B:
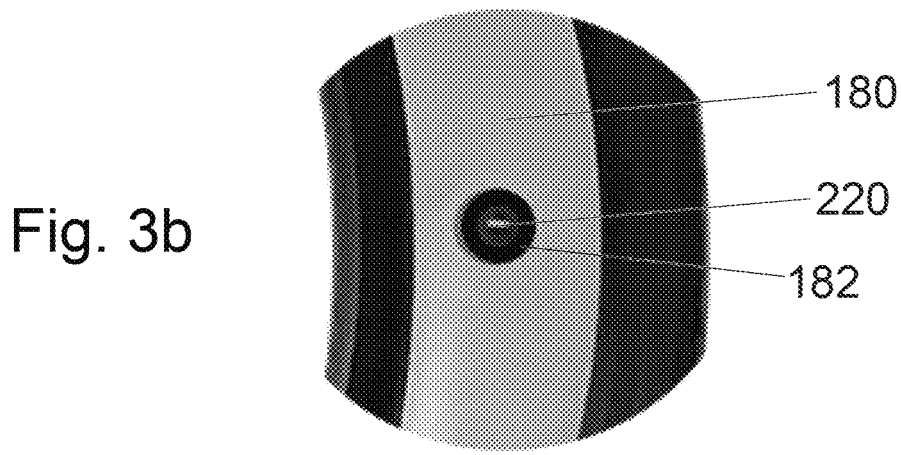
FIG. 3b shows the area Mb of FIG. 3a in more detail.

Before attaching, the noise-absorbing agent 180 may be, for example, solid material, such as polymer foam. Thus, a sheet of suitable size can be formed of the noise-absorbing agent 180 before it is installed on the inside of the tyre 100, and it can be attached to the inside of the tyre 100 by, for example, said adhesive or tape. If the noise-absorbing agent 180 is provided on the tyre 100 in this way, a seam 185 is formed in the noise-absorbing agent (see FIG. 3*a*). Such a seam 185 extends from a first side to an opposite second side of the noise-absorbing agent 180 on the inner surface 111 of the tyre 100 (see FIG. 3*a*). The seam 185 may extend substantially in the axial direction SAX (see FIG. 1), as shown in FIG. 3*a*. The seam 185 does not necessarily extend in the axial direction SAX. The seam 185 is not necessary straight either. The direction and the straightness of the seam 185 depend on, among other things, the shape of the sheet of noise-absorbing agent to be attached inside the tyre, which may be e.g. a rectangle or a parallelogram whose end sides (forming the seam 185) are not necessary straight but may have e.g. a serrated or corrugated pattern. More than one seam 185 may be provided as well.

Preferably, the module 220 does not cut said seam 185 in the noise-absorbing agent. This is because the noise-absorbing agent 180 is preferably attached to the tyre body 102 (or will be attached to the tyre) particularly close to the seam 185, to secure the attachment of the noise-absorbing agent 180. On the other hand, for the above presented reasons, a spot 182 free from noise-absorbing agent is provided at the module 220 on the inner surface 111 of the tyre 100. These both aims can be achieved when the module 220 does not cut said seam 185 of the noise-absorbing agent. In other words, the seam 185 extends from the first side to the opposite second side of the noise-absorbing agent 180 on the inner surface 111 of the tyre 100 without intersecting the spot 182 free from noise-absorbing agent. Furthermore, the fact that the seam 185 extends without intersecting the spot 182 free from noise-absorbing agent allows the location for the sensor 210 to be selected more freely, because the module 220 is aligned with the sensor 210 in the tyre 100.

To secure better attachment of the noise-absorbing agent 180 to the tyre 100, one embodiment comprises cleaning of the inner surface 111 of the tyre before providing the noise-absorbing agent 180. More precisely, in one embodiment, the inner surface 111 of the tyre is cleaned after vulcanization and before providing the noise-absorbing agent 180. Cleaning improves the attachment both in the embodiment in which adhesive or tape is used for attaching the noise-absorbing agent, and in the embodiment in which the noise-absorbing agent as such adheres to the tyre (without adhesive or tape). For example, the inner surface 111 of the tyre, such as a vulcanized tyre, can be cleaned by laser.

Cleaning may be necessary particularly because release chemicals may be used during vulcanization, to facilitate the removal of the vulcanized tyre from its manufacturing mould. Residues of such release chemicals may be left on the inner surface 111 of the tyre and thereby hamper the attachment of the noise-absorbing agent to the tyre.

It is also possible to protect the inner surface 111 of the tyre during vulcanization, for example with a suitable film. In such a solution, instead of cleaning the inner surface, the protective film can be removed from the inner surface 111 of the tyre.

As presented above, the tyre preferably comprises an inner liner 131 provided to improve the tightness of the tyre. In such an embodiment, before providing the noise-absorbing agent 180, the inner liner 131 typically constitutes the inner surface 111 of the tyre. Thus, in an embodiment of the method, noise-absorbing agent 180 is provided on the inside of such a tyre 100 where an inner liner 131 constitutes the inner surface 111 before the noise-absorbing agent is provided in the tyre.

Although, in an embodiment, noise-absorbing agent 180 is removed from such a tyre in the above described way, and the noise-absorbing agent 180 can be cut in connection with the removal, the inner liner 131 should not be damaged (e.g. punched) when cutting the noise-absorbing agent, to secure the operation of the tyre. Therefore, in an embodiment, the location 221 for the module is formed by removing part of the noise-absorbing agent 180 without making a hole in the inner liner; that is, in such a way that the inner liner 131 remains intact. What has been said on the material of the inner liner 131 in connection with the tyre also applies in connection with the method. Such a tyre 100 comprises an inner liner 131 provided to improve the tightness of the tyre 100. At least part of the inner liner 131 is arranged between the noise-absorbing agent 180 and the outer surface of the tyre 100. More precisely, at least part of the inner liner 131 is arranged in such a space between the noise-absorbing agent 180 and the outer surface of the tyre 100 that is outside the noise-absorbing agent 180 in the radial direction SR (see FIGS. 1a and 1b). As presented above, the inner liner 131 is unbroken, particularly in a tyre 100 having a module 220.

As presented above, the tyre preferably comprises a reinforcement 130. Preferably, the reinforcement comprises at least one of the following: [A] a ply cord (126, 127) comprising a fibrous substance, and [B] a metal belt, such as a steel belt. The reinforcement 130 is arranged between the tread 112 and the inner surface 111. Preferably, the tread 112 is provided with said blind hole 212 at the location 211 for the sensor so that the blind hole 212 does not extend through the reinforcement 130. In other words, the blind hole 212 is arranged at the location 211 for the sensor without punching the reinforcement 130. Thus, the reinforcement 130 remains intact, although the blind hole 212 is formed in the tyre, whereby the reinforcement 130 reinforces the tyre 100 as desired. Such a tyre 100 comprises a reinforcement 130, such as a ply cord (126, 127) or a metal belt (124, 125), between the tread 112 and the inner surface 111. The tyre 100 also comprises a sensor 210 which does not extend through the reinforcement 130. In particular, said reinforcement 130 is outside the inner surface 111, in the radial direction SR (see FIGS. 1a and 1b).

In an embodiment, the noise-absorbing agent 180 is ultralight material, such as foam (e.g. cellular foam) or other material of light weight. In this context, ultralight material refers to a material having a density lower than 10 kg/m³.

Preferably, the noise-absorbing material 180 comprises polymer-based foam, i.e. polymer foam. In this context, polymer foam refers to dispersion of gas in a polymer matrix. A polymer foam consists of at least two phases: a solid polymer matrix and a gas phase. The gas phase may also be called blowing agent. Other solid phases may also be present in foams, for example in the form of bulking agents. Polymer foams may be, for example, expanded rubber or cellular elastomer or spongy. The polymer matrix may be thermoplastic or thermosetting plastic. Physical and mechanical properties of polymer foam differ significantly from those of a corresponding solid polymer matrix material. Cellular plastic is an example of polymer foam.

The matrix material for polymer foam can be selected from a plurality of polymers as needed. In an example according to the method, the matrix material for polymer foam is selected, or the matrix material for polymer foam in the tyre has been selected, from a group consisting of the following materials: ethylene vinyl acetate (EVA), polyethylene (PE), nitrile rubber (NBR), polychloroprene, neoprene, polyimide, polypropylene, polystyrene, polyurethane, polyvinyl chloride (PVC), and silicone.

Examples of other substances which are ultralight with respect to their density include aerogels (such as silicon dioxide aerogel and carbon nanotube aerogel), other foams (such as metal foams), microlattices (such as metal microlattices), and aerographite.

In an example, the noise-absorbing agent 180 is polymer foam. In an example, the noise-absorbing agent 180 is polymer foam and comprises polyurethane.

In an embodiment, the thickness of the noise-absorbing agent 180, measured in the radial direction SR of the tyre, is at least 10 mm. In an embodiment, the thickness of the noise-absorbing agent, measured in the radial direction SR of the tyre, is not greater than 75 mm. In an embodiment, the thickness of the noise-absorbing agent, measured in the radial direction SR of the tyre, is 20 mm to 60 mm, more preferably 30 mm to 50 mm. Such dimensions are generally applicable to foamy noise-absorbing agents and cellular foams as presented above.

In an embodiment, the volume of the bulking agent 180 is at least 20% of the volume delimited by the body 102 of the tyre 100 and a rim suitable for the tyre.

The invention claimed is:
1. A method for manufacturing a tyre, comprising:
providing an unvulcanized tyre;
vulcanizing the tyre,
forming a blind hole for a sensor in the tyre before or during the vulcanizing the tyre, wherein the tyre comprises a tread, the blind hole for the sensor, and an inner surface,
installing the sensor in the blind hole for the sensor,
providing a noise-absorbing agent for absorbing tyre noise, on the inside of the vulcanized tyre so that:
part of the inner surface comprises a location for a module, free from the noise-absorbing agent,
attaching the module to the location for the module, wherein:
the module comprises means for wireless data transmission,
the module comprises means for reading data from the sensor inductively, and
the sensor comprising means for inductive data transmissions to said module;
the method comprising:
detecting the blind hole for the sensor or the sensor, and aligning the location for the module by using location data obtained by the detection of the blind hole or the sensor so that a straight line which is parallel to a normal of the tread of the tyre at the location for the sensor passes through the location for the module and the location for the sensor, and/or a straight line which is parallel to the normal of the inner surface of the tyre at the location for the module passes through the location for the module and the location for the sensor, and after providing the noise-absorbing agent on the inside of the vulcanized tire, removing a portion of the noise-absorbing agent to form the location for the module, at which the inner surface of the tyre is free from the noise-absorbing agent.

2. The method according to claim 1, comprising:
installing the sensor in the blind hole before providing the noise-absorbing agent on the inside of the tyre.

3. The method according to claim 1, comprising:
attaching the module to the tyre by at least adhesive or tape.

4. The method according to claim 1, comprising:
attaching the module to the tyre by a double-sided tape by:
attaching a first side of the double-sided tape to the location for the module on the inner surface of the tyre after vulcanization of the tyre;
providing a second side of the double-sided tape with an adhesive and a release film covering the adhesive;
providing the noise-absorbing agent on the inside of the tyre so that the noise-absorbing agent covers the double-sided tape;
removing the noise-absorbing agent from an area defined by the double-sided tape by
cutting an incision at the location of the double-sided tape in the noise-absorbing agent,
removing the noise-absorbing agent from an area defined by the incision; and
removing the release film from the double-sided tape.

5. The method according to claim 1, comprising:
applying a tool comprising a laser, a saw, a drill, a mill, or a gripping device, for removing the noise-absorbing agent, provided on the inside of the vulcanized tyre, and/or for cutting an incision in the noise-absorbing agent provided on the inside of the vulcanized tyre, wherein the tool is aligned with the location of the module.

6. The method according to claim 1, comprising:
attaching the noise-absorbing agent to the inner surface of the tyre by tape or adhesive, wherein:
the location for the module is where no adhesive or tape for attaching said noise-absorbing agent is provided between the noise-absorbing agent and the body of the tyre.

7. The method according to claim 1, comprising:
cleaning the inner surface of the tyre before providing the noise-absorbing agent, or
removing a protective film from the inner surface of the tyre before providing the noise-absorbing agent.

8. The method according to claim 1, wherein:
the tyre comprises an inner liner arranged to improve tightness of the tyre, and
the location for the module is formed by removing part of the noise-absorbing agent without making a hole in the inner liner.

9. The method according to claim 1, wherein:
the tyre comprises a reinforcement comprising a ply cord and/or a metal belt, between the tread and the inner surface, wherein the method comprises:
providing the tread with said blind hole at the location for the sensor without punching the reinforcement.

10. The method of the claim 1, wherein:
a density of the noise-absorbing agent is lower than 10 $kg/m^3$ or the noise-absorbing agent comprises foam, and/or
a thickness of the noise-absorbing agent is at least 10 mm.

11. A method for manufacturing a tyre, comprising:
vulcanizing the tyre, wherein the tyre comprises a tread and an inner surface;
providing a noise-absorbing agent for absorbing tyre noise, on an inside of the tyre so that part of the inner surface comprises a location for a module, free from the noise-absorbing agent;
attaching the module to the location for the module;
wherein:
the module comprises means for wireless data transmission,
the module comprises means for reading data from a sensor inductively;
providing a blind hole for the sensor at a location for the sensor in the tread before, during, or after vulcanization;
aligning the location for the sensor and the location for the module to each other so that a straight line which is parallel to a normal of the tread of the tyre at the location for the sensor passes through the location for the module and the location for the sensor, and/or a straight line which is parallel to the normal of the inner surface of the tyre at the location for the module passes through the location for the module and the location for the sensor;
installing the sensor in said blind hole, the sensor comprising means for inductive data transmission to said module;
attaching the module to the tyre by a double-sided tape by:
attaching a first side of the double-sided tape to the location for the module on the inner surface of the tyre after vulcanization of the tyre;
providing a second side of the double-sided tape with an adhesive and a release film covering said adhesive;
providing the noise-absorbing agent on the inside of the tyre so that the noise-absorbing agent covers the double-sided tape;
removing the noise-absorbing agent from an area defined by the double-sided tape by cutting an incision at a location of the double-sided tape in the noise-absorbing agent;
removing the noise-absorbing agent from the area defined by the incision; and
removing the release film from the double-sided tape.

* * * * *